United States Patent [19]

Vogel

[11] Patent Number: 5,590,537
[45] Date of Patent: Jan. 7, 1997

[54] DRY GAS CURTAIN FOR CRYOGENIC SURFACE

[75] Inventor: Herman Vogel, Newtown, Conn.

[73] Assignee: The Perkin-Elmer Corporation, Norwalk, Conn.

[21] Appl. No.: 524,555

[22] Filed: Sep. 7, 1995

[51] Int. Cl.$^6$ .................................................. F25B 19/00
[52] U.S. Cl. .............................. 62/51.1; 62/258; 454/188
[58] Field of Search ......................... 62/51.1, 258, 259.2, 62/908; 454/188

[56] References Cited

U.S. PATENT DOCUMENTS

| | | | |
|---|---|---|---|
| 3,866,428 | 2/1975 | Simonet et al. | 62/908 |
| 4,137,750 | 2/1978 | French et al. | 454/188 |
| 5,105,628 | 4/1992 | Nakai | 62/259.2 |
| 5,261,243 | 11/1993 | Dunsmore | 62/259.2 |

OTHER PUBLICATIONS

"Aerodynamic Characteristics of Damping Screens" by G. B. Schubauer, W. G. Spangeberg & P. S. Klebanoff, National Adv. Committee for Aeronautics (NACA) TN 2001 (Jan. 1950).

"Subsonic Internal Aerodynamics", Pratt & Whitney Aircraft Florida Research & Development Center, PDS-3614, Sections J and K (May 4, 1970).

"Boundary-Layer Theory" by Herman Schlichting, transl. by J. Kestin, 6th ed., pp. 173-176, McGraw Hill (1955).

Primary Examiner—Ronald C. Capossela
Attorney, Agent, or Firm—Edwin T. Grimes; Herbert S. Ingham

[57] ABSTRACT

An apparatus to provide a laminar curtain of dry gas over a cryogenic working surface includes a housing duct extending longitudinally from the working surface. A honeycomb member fills a section of the duct adjacent to the working surface, each honeycomb cell having a through channel in the longitudinal direction. A porous foam with through porosity fills a section of the duct adjacent to the honeycomb member oppositely from the working surface. A plenum is adjacent to the porous member oppositely from the honeycomb. Dry gas is supplied to the plenum to flow through the foam and honeycomb to effect the laminar curtain.

3 Claims, 1 Drawing Sheet

DRY GAS CURTAIN FOR CRYOGENIC SURFACE

This invention relates to protection of a cold surface against condensation from the ambient atmosphere, and particularly to an apparatus for providing a laminar curtain of dry gas over the cold surface of a cryogenic device such as a calorimeter.

BACKGROUND

A number of devices and instruments such as calorimeters utilize liquid nitrogen or other liquified gas in a reservoir at very low temperature. Such instruments often have a cooled ("cryogenic") working surface that normally is enclosed under a cover during operation of the instrument. When the cover is opened for insertion, removal or manipulation of samples for test, the working surface and samples are exposed to ambient air. Humidity in the air generally condenses or frosts the working surface and samples unless protection is provided. Conventional protection is provided by a dry box which is placed as a cover over the working area at least during the time of sample manipulation. Such a box has dry air or nitrogen passed in at a slight pressure, holes with a pair of gloves extending into the box, and an interlock for passing through samples. This system is quite cumbersome to use, particularly in the manipulation of delicate samples with tweezers while using the gloves.

Laminar gas flows have been used for doorways to minimize the mixing of outside with inside air, so that people can pass through without opening doors, for example to protect the inside against temperature extremes or medical contamination. Laminar flow hoods have been used for working with materials subject to, or causing external contamination, such as in forensics. Another application for laminar flow has been the cooling of gas turbine blades.

SUMMARY

An object of the invention is to provide means for preventing condensation or frosting on a cryogenic working surface. Another object is to provide a device for effecting a curtain of dry gas over a cryogenic working surface, particularly to prevent condensation and frosting on the surface.

The foregoing and other objects are achieved, at least in part, by an apparatus comprising a housing duct formed of walls including a base wall and a parallel top wall having a spacing from the base wall. The base wall extends contiguously from the working surface in a longitudinal direction substantially parallel to the cryogenic surface, with the duct opening onto the working surface. A honeycomb member fills a first section of the duct adjacent to the working surface. The honeycomb member is formed of a multiplicity of cells, each cell having a through channel in the longitudinal direction, a cross section with an average diameter, and an aspect ratio of channel length to average diameter. A porous member with through porosity fills a second section of the duct adjacent to the honeycomb member oppositely from the working surface. A plenum is delimited in the duct adjacent to the porous member oppositely from the honeycomb member. A gas means is connected to supply the plenum with a dry gas. The gas pressure is selected cooperatively with the porosity, the wall spacing, the cross section and the aspect ratio to effect a flow of gas through the porous member and the honeycomb member with a gas velocity such that a laminar curtain of the gas is effected across the cryogenic working surface.

BRIEF DESCRIPTION OF THE DRAWING

The drawing is a cross section in elevation of an apparatus of the invention utilized with a cryogenically cooled calorimeter.

DETAILED DESCRIPTION

Figure 1:
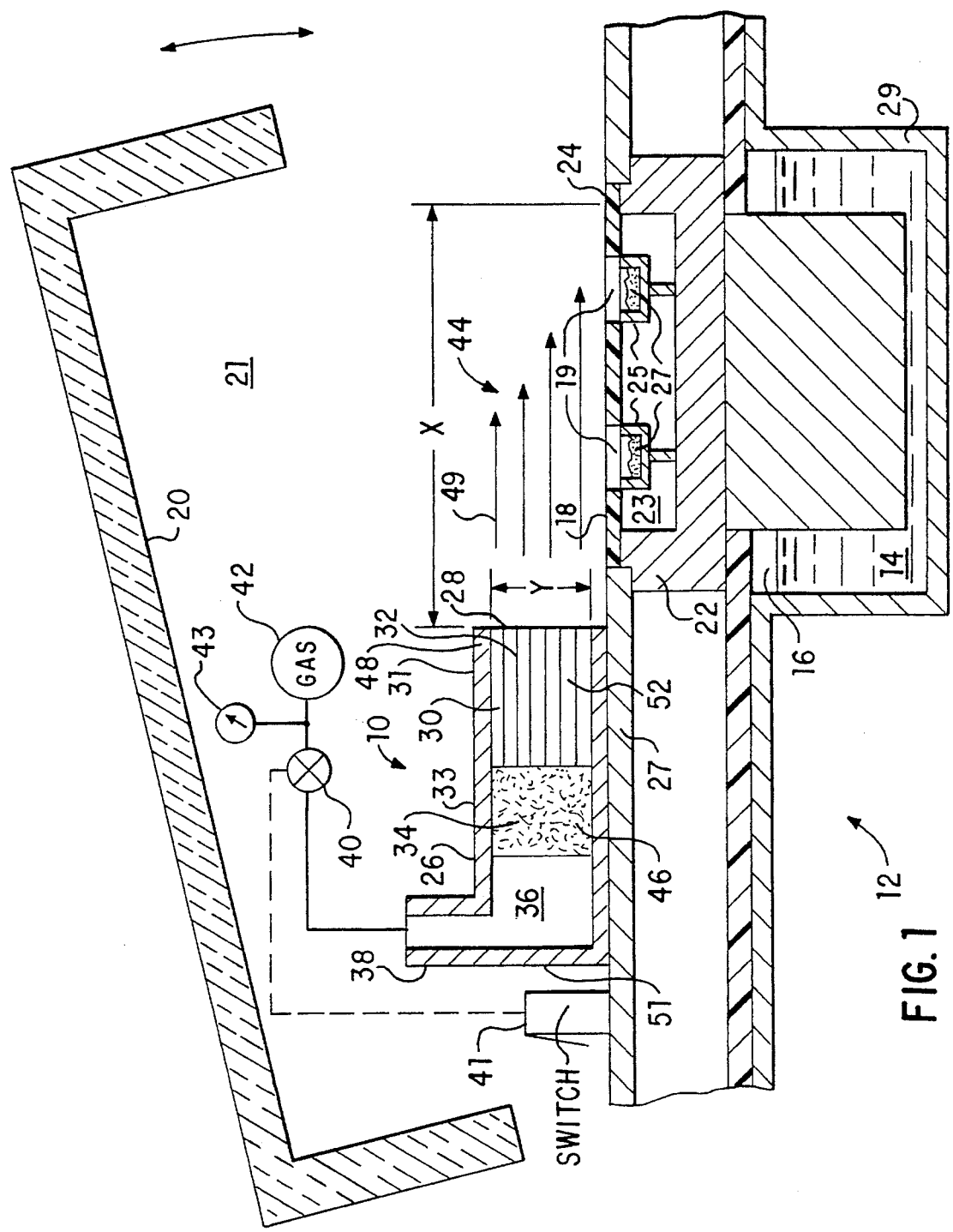

An apparatus 10 is used in conjunction with a cryogenic device or instrument 12, for example a differential scanning calorimeter (DSC), such as a Perkin-Elmer model DSC-7, which utilizes liquid nitrogen 14 or other liquified gas in a reservoir 16 at very low temperature (−196° C. for liquid nitrogen). Such an instrument has a cooled, cryogenic surface region 18 that normally is enclosed under a cover 20 (shown partially removed). When the cover is removed, the surface is subject to condensation or frosting from the ambient air 21. The surface 18 need not be smooth. For example, a DSC may have a sample block 22 with a cavity 23 covered by a lid 24, with holes 19 and sample cups 25 with samples 27 in the cavity, and a cooling member 29 for the block extending down into the liquid nitrogen. It will be appreciated that the apparatus of the invention may be used to protect surfaces with other configurations and other cryogenic applications, or even a simple cold working surface not associate with an instrument. As used herein and in the claims, the term "cryogenic" refers to the low temperature of the liquified phase of a substance that is gaseous at atmospheric temperature and pressure, such as liquid nitrogen, oxygen, hydrogen or helium.

Components of the apparatus include a housing duct 26 of sheet metal or the like resting on a cover 27 of the DSC (or other surface), the duct having an outlet end 28 adjacent to the working surface 18. A honeycomb member 30 fills a first section 31 of the duct at the outlet end, with open, longitudinal cells 32 extending along the duct. A porous member 34 fills a second section 33 of the duct adjacent to the honeycomb on the opposite side from the outlet. A gas plenum 36 is delimited in the duct on the other side of the porous member from the honeycomb. Dry gas such as dried air or nitrogen is supplied through an inlet pipe 38 and a gas valve 40 to the plenum from a pressure regulated gas supply source 42 having a pressure gage 43. The valve may be actuated by a switch 41, the valve being closed by contact of the switch by the cover 20 when the latter is in place, and opened when the cover is removed (as shown). The plenum is a region for dispersing most of the inlet gas velocity. The gas flows from the plenum through the porous material 34 which further disperses the gas flow and reduces its velocity to a very low level such that is can enter the honeycomb section uniformly. The gas thence flows through the cells 32 of the honeycomb which are selected with a dimensional cross section relative to the flow rate and gas properties to effect a laminar gas flow 44 across the working area 18 for a desired working distance X. This flow effects a protective curtain of the dry gas, preventing or at least substantially reducing condensation or frosting on the surface.

The housing duct 26 is formed of a flat base wall 46, a parallel top wall 48 separated by a wall spacing (duct height) Y from the base wall. The duct has vertical, parallel side walls (not shown). The base wall extends contiguously from the effective working surface 18 oppositely from the longitudinal direction 49 of flow, substantially parallel to the effective cryogenic working surface, so that the duct opens onto the working surface. The duct has a sideways width (between the side walls) as needed to provide a suitable working area, for example 5 to 15 cm across. The duct height Y should be uniform for the sections of duct containing the porous member and the honeycomb, and must be sufficient to establish a laminar curtain for a distance X along the working surface, e.g. Y=4 mm. The porous member enables the plenum to be non-uniform and still provide good flow distribution through the honeycomb for uniform laminar flow. The porous member also affords a means to minimize the plenum volume. The plenum thus may be configured to accommodate other external features such as the cover 20, for example with a curvature (not shown) in the rear side 51 of the plenum.

The porous member 34 is formed of a foam or the like that has through porosity suitable to provide the selected gas flow therethrough under an applied pressure, for example 180 (standard) ml/sec at 2.1 kg/cm$^2$ gage (12 psig) pressure from the plenum 36 for a 0.4 cm by 9 cm duct cross section. A suitable material is a polyester foam grade 62000 supplied by General Foam Co., Paramus N.J., having a foam thickness in the flow direction of 0.5 cm.

The honeycomb 30 is formed of the multiplicity of cells 32 each having a through channel 52 in the longitudinal direction. The cells preferably are substantially identical. The material for the honeycomb is not critical, but should be corrosion resistant, for example a stainless steel. The length of the honeycomb cells through the duct may be, for example, 1.6 cm.

The porous member functions to substantially eliminate turbulence and to ensure that each honeycomb cell receives the same flow rate so as to achieve the low Reynolds number. Without the porous member, a factor of about 100 increase in plenum volume would be needed. The length of the cells 32 should be sufficient to ensure that the flow from each cell is laminarly developed and parallel. Preferably each cell channel has an aspect ratio of length to average diameter between about 20 and 60, for example 3 cm length and 1 mm diameter for a ratio of 30. The cells of a honeycomb are typically hexagonal, with an average diameter (hydraulic diameter) being the diameter of a circle having the same cross sectional area as the cell. The flow rate is selected to substantially eliminate mixing of the flows exiting from the cells, so as to effect the laminar gas curtain.

With laminar flow across the working surface, there is only very small mixing with the ambient air above. The height of the duct, i.e. the spacing between base and top walls, can be relatively small but must be enough to provide sufficient protection of the surface with a reasonable flow rate. The spacing of the top wall from the base wall is dependent on other parameters. Determination of this and other dimensional aspects and gas flow rate may be determined by theory set forth below. The references cited below are incorporated herein by reference.

A critical Reynolds number for the honeycomb cells depends on the "solidity ratio" of structural frontal area to total open flow area. In the present example, for a honeycomb wall thickness of 0.05 mm and average cell diameter of 1 mm, the ratio computes to 0.15. A reference is "Aerodynamic Characteristics of Damping Screens" by G. B. Schubauer, W. G. Spangeberg and P. S. Klebanoff, National Advisory Committee for Aeronautics (NACA) TN 2001 (January 1950), particularly page 35, Figure 13. In accordance with the graph plotted in this Figure 13, the critical Reynolds number for this ratio is about 68.

An additional reference is "Subsonic Internal Aerodynamics" Pratt & Whitney Aircraft, Florida Research & Development Center PDS-3614 (May 4, 1970), particularly page K-24, Figure K-2. This is in respect to shedding vortices, wherein a ratio "L/d" is plotted against "X/d" where L is vortex diameter and X is distance downstream from a grid of wires having diameters d. The ratio L/d should be one to substantially eliminate mixing between flows. From the Figure K-2, for L/d=1 X/d=125. It was determined that it is suitable to equate the grid wire diameter from the reference to the honeycomb cell diameter for the present case. Thus for a selected X=10 cm working surface, the average cell diameter is d=0.8 mm.

A further reference is "Boundary-Layer Theory" by Herman Schlichting, translated by J. Kestin, McGraw Hill, 6th ed. (1955), particularly page 175, Fig. 9.15. In this figure a "quiescent ambient mixing spreading factor Reynolds number" N is plotted against a ratio $U/U_1$, for a case (inter alia) of the minimum velocity being zero in the zone. This Reynolds number is $N=Y \cdot [(U_1/X) \cdot (\mu/D)]^{1/2}$, where $U_1$ is the maximum velocity in a zone between two interacting parallel streams (effectively the velocity inside the honeycomb), $U/U_1$ is velocity gradient, X is the selected length of the working surface from the duct, Y is the height of the honeycomb, $\mu$ is the dynamic viscosity of the gas, and D is the density of the gas. This Reynolds number is a critical Reynolds number for transition from laminar to non-laminar flow between two parallel streams. The actual flow must have a Reynolds number below this. It may be seen that N depends on selection of X and Y.

It is desired that the velocity gradient be low, e.g. 0.2, yielding N=2.4 which thereby allows computation of $U_1$=0.55 m/sec (using gas data from standard tables or formulas for nitrogen). This gives an actual stream tube Reynolds number $Re=D \cdot U_1 \cdot d/\mu$ of 29 which is lower than the critical number of 68 determined above, and provides a sufficient safety margin factor of about 2.3. In general, the margin factor should be between about 1.5 and 3, providing the laminar flow with sufficient volume to provide a practical gas curtain. The computed velocity is provided by a gas flow rate of 178 ml/sec for a honeycomb 9 cm wide and 4 mm thick.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An apparatus for providing a curtain of dry gas over a cryogenic working surface of a cryogenic device, comprising:

a housing duct formed of walls including a base wall and a parallel top wall having a spacing therefrom, the base wall extending contiguously from the working surface in a longitudinal direction substantially parallel to the cryogenic surface, the duct opening onto the working surface;

a honeycomb member filling a first section of the duct adjacent to the working surface, the honeycomb member being formed of a multiplicity of cells, with each honeycomb cell having a through channel in the longitudinal direction, a cross section with an average diameter, and an aspect ratio of channel length to average diameter;

a porous member with through porosity, the porous member filling a second section of the duct adjacent to the honeycomb member oppositely from the working surface, a plenum being delimited in the duct adjacent to the porous member oppositely from the honeycomb member; and gas means connected to supply the plenum with a dry gas at a gas pressure selected cooperatively with the porosity, the spacing, the cross section and the aspect ratio to effect a flow of gas through the porous member and the honeycomb member with a gas velocity such that a laminar curtain of the gas is effected across the cryogenic working surface.

2. The apparatus of claim 1 wherein the working surface has a selected length from the duct, the flow of gas has a critical Reynolds number dependent on the selected length and the wall spacing, and the flow of gas in each duct has an actual Reynolds number less than the critical Reynolds number by a factor between about 1.5 and 3.

3. The apparatus of claim 1 further comprising a removable cover for the working surface, and means cooperative with the cover to effect gas flow through the duct when the cover is closed and stop the gas flow when the cover is opened.

* * * * *